Patented June 24, 1941

2,246,547

UNITED STATES PATENT OFFICE 2,246,547

ISOPRENE VALERATES AND PROCESS FOR MAKING SAME

Frank J. Soday, Swarthmore, Pa., assignor to The United Gas Improvement Company, a corporation of Pennsylvania No Drawing. Application April 24, 1940,
Serial No. 331,401

12 Claims. (Cl. 260—488)

The present invention relates to new compositions of matter and to methods for their preparation.

More particularly, this invention pertains to isoprene valerates and to methods for the preparation of these isoprene derivatives.

By the term "isoprene valerate" throughout the specification and claims is meant a valeric acid ester of "isoprene alcohol," which alcohol may alternatively be designated as dimethylvinyl carbinol (see Whitmore's "Organic Chemistry" (1937) at page 56), or as 3-methyl-3-hydroxy-butene-1.

This invention is based upon the discovery that isoprene valerate having the general formula

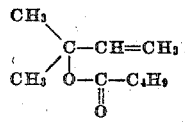

and the following specific formulas

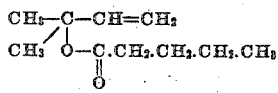

Isoprene n-valerate and

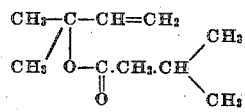

Isoprene isovalerate

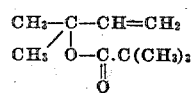

Pivalic acid ester of isoprene alcohol and

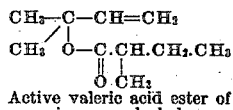

Active valeric acid ester of isoprene alcohol may be prepared in excellent yields through the reaction of the corresponding valeric acids or their salts or derivatives upon isoprene alcohol, isoprene alcohol derivatives, such as the metal derivatives, or hydrohalogen derivatives of isoprene. High yields are obtained despite the fact that tertiary alcohols as a rule either do not react at all with organic carboxylic acids, or react with very low yields.

It is an object of the present invention to provide new compositions of matter, namely, isoprene valerates, and a process for the preparation thereof. Another object of this invention is to provide new compounds having utility in a number of chemical and related industries. More specifically, it is an object of this invention to provide isoprene derivatives which may be used as solvents for paints, lacquers, varnishes, enamels or similar coating compositions. Another specific object of this invention is to provide compounds which may be used as ingredients in perfumes and various pharmaceutical preparations. Still another specific object of this invention is to provide compounds which may be used as intermediates in chemical synthesis. Other objects and advantages of the invention will be apparent to those skilled in the art from the following description.

Isoprene, having the general formula

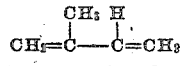

is the basic component in the preparation of these new compositions of matter, namely, isoprene valerates. It may be obtained from various sources, such as synthetically from the pyrogenic decomposition of rubber, or from fractions obtained upon the fractionation of condensates obtained in the manufacture of carburetted water gas, oil gas, refinery gas, or coke oven gas, or from similar sources. Such fractions will be referred to herein, generally, as light oil isoprene fractions. Such fractions obtained in the manufacture of oil gas are particularly preferred.

Hydrocarbon fractions containing from 5 to 100% of isoprene may be successfully used in the production of the herein described isoprene derivatives, although in general the use of fractions containing from 50 to 100% isoprene is preferred for the production of products of high quality.

In general, the initial step in the preparation of my new isoprene derivatives is the conversion of isoprene into a monohydrohalogen derivative. The preparation of the hydrogen halide derivative may be effected in a number of ways.

For instance, liquid or gaseous hydrogen halide may be introduced into isoprene, or into an isoprene fraction, say by means of a porous tube, or a pipe containing a porous cap, or otherwise.

On the other hand, liquid or gaseous hydrogen halide may be contacted with liquid or gaseous isoprene or isoprene fraction in a kettle, or in an open or packed tower, or otherwise.

The reactants may be contacted in any desired manner, for instance, concurrently, or counter-currently, or in a static system.

I prefer to employ hydrogen chloride as the hydrogen halide. However, other hydrogen halides such as hydrogen bromide, hydrogen iodide, or hydrogen fluoride, may be employed without departing from the spirit of the invention.

When a hydrogen halide, for example, hydrogen bromide, is added to isoprene, it is thought that the following reaction takes place:

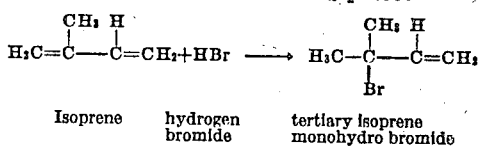

Isoprene — hydrogen bromide — tertiary isoprene monohydro bromide

The unstable tertiary bromide thus formed, namely, 3-methyl 3-bromo-butene-1, presumably changes, at least in part, on standing to a primary bromide, namely, 2-methyl 4-bromo-butene-2, having the following formula:

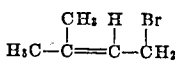

Primary isoprene monohydrobromide

However, there is some evidence that in the case of the chloride as distinguished from the bromide, that this rearrangement does not take place in large part, if at all.

Isoprene monohydrohalides may be prepared in the following manner:

*Example 1*

An isoprene fraction containing 70% by weight of isoprene was obtained by the fractionation of condensate obtained in the manufacture of oil gas.

This fraction also contained some olefines boiling in the same range and possibly some piperylene and cyclopentadiene. Isoprene fractions of lower concentration may contain considerable quantities of these materials.

A quantity equivalent to approximately 476 parts by weight of this fraction was cooled to approximately 0° C., whereupon a stream of dry hydrogen chloride was introduced into the isoprene fraction over a period of 10 hours, the temperature being maintained at approximately 0° C. throughout the entire time.

The mixture was then allowed to stand overnight and was then distilled.

That portion of the distillate boiling within the range of 30 to 33° C. at 40 mm. pressure, absolute, was collected as isoprene monohydrochloride.

That portion of the distillate boiling below 90° C. at atmospheric pressure and comprising for the most part unchanged isoprene, was retreated and distilled in the same manner. The distillate collected between 90 and 110° C. at atmospheric pressure was combined with the first distillate.

There was thus obtained a quantity of isoprene monohydrochloride equivalent to approximately 370 parts by weight. This fraction of isoprene monohydrochloride had the following physical properties:

Density ($d\ 20°/4°$) — 0.9218
Refractive index ($n\ 20°/D$) = 1.43975

A quantity equivalent to approximately 260 parts by weight of hydrogen chloride was absorbed. This corresponds with the theoretical quantity required to add hydrogen chloride to one of the double bonds of the isoprene contained in the given quantity of starting material.

The preparation of isoprene monohydrohalide in the above manner may be carried out at any suitable temperature.

Temperatures between —60 and 36° C. may be employed for the production of isoprene monohydrohalide in the liquid phase, isoprene boiling at the upper temperature limit indicated.

On the other hand, if desired, the reaction may be carried out in the vapor phase by employing temperatures above 36° C. although there are limiting factors such as the tendency of isoprene to form isoprene dihydrohalide, which may or may not be desired, or to polymerize at elevated temperatures in the presence of an acid catalyst.

In general, it is preferred to carry out the reaction in the liquid phase, while employing temperatures between —60° and 10° C.

If desired, halogenating catalysts may be employed to accelerate the addition of hydrogen halide to the isoprene molecule. Examples of halogenating catalysts are methyl alcohol and acetone.

The isoprene monohydrohalide thus obtained, namely the distillate boiling between 90° C. and 110° C. at atmospheric pressure or, if desired, the crude reaction product prior to distillation, or any fraction thereof, whether narrower or wider than the above fraction, may be employed in the preparation of isoprene valerate, although a fairly pure material is generally preferred.

The desired isoprene valerate may be prepared (1) by converting the isoprene monohydrohalide into isoprene alcohol which is then reacted with the corresponding valeric acid, or its anhydride, or its acid halide, or (2) by reacting a metal derivative of isoprene alcohol, such as the sodium derivative (i. e., the alcoholate) with the selected valeric acid or its anhydride, or its acid halide, or (3) by reacting isoprene monohydrohalide directly such as with a metal valerate of which potassium n-valerate is an example. Mixtures of the isoprene valerates may be prepared by using mixtures of the valeric acids, their anhydrides, or their acid halides, or combinations of the foregoing. The valerates thus obtained may be separated, if desired, such as by distillation.

The conversion of isoprene monohydrohalide into isoprene alcohol may be effected in any desired manner, for example, the isoprene monohydrohalide may be hydrolyzed with aqueous alkaline solutions such as sodium hydroxide, potassium hydroxide, sodium carbonate, sodium bicarbonate, calcium hydroxide, and similar reagents. In general, the use of mild alkalis such as sodium carbonate at moderate temperatures such as, for example, between 30 and 100° C. and at moderate pressures such as, for example, between 1 to 2 atmospheres is preferred.

If desired, hydrolysis may be effected in the presence of a suitable solvent, such as for example toluene.

Upon hydrolysis of the halide, it is believed that a molecular rearrangement takes place as follows:

$$CH_3-\underset{|}{C}=\underset{|}{\overset{H}{C}}-\underset{|}{\overset{Br}{C}}H_2+H_2O \longrightarrow CH_3-\underset{\underset{OH}{|}}{\overset{CH_3}{C}}-\overset{H}{C}=CH_2+HBr$$

Isoprene mono-   water   isoprene   hydrogen
hydrobromide                alcohol    bromide provided the rearrangement of tertiary isoprene monohydrohalide to primary monohydrohalide actually takes place. If not, then this step comprises the hydrolysis of the tertiary form.

The isoprene alcohol obtained in this manner may be refined by fractionation or otherwise, or if desired, the alcohol may be directly employed in the preparation of esters without refining. However, the former is frequently preferred.

Isoprene alcohol may be reacted with the valeric acid or its anhydride, or its acid halide, by combining the reactants, preferably with the application of heat. A suitable method is to heat the reactants in a closed container provided with a reflux condenser until the reaction is substantially complete.

I prefer to dissolve the reactants in a solvent such as benzene, particularly when employing the refluxing method.

Since the reaction forms water, there is produced a ternary mixture consisting of isoprene alcohol, benzene and water. The water formed may be removed during the esterification reaction if desired. This may be accomplished, for instance, by permitting the reflux condensate to collect and stratify in a separate receptacle, whereupon the water layer is continuously removed and the remainder of the condensate is returned to the reaction zone.

On the other hand, the water may be removed, after the reaction has become completed, among other ways, by separating the liquid layers, whereupon the solvent and unreacted alcohol may be removed from the reaction product by distillation or otherwise.

Unreacted valeric acid present in the reaction product may be neutralized by an alkali or alkaline solution, if desired, such as sodium bicarbonate, preferably before the removal of solvent and unreacted alcohol. On the other hand, the unreacted valeric acid may be separated from the other constituents by distillation.

The preparation of isoprene alcohol and its reaction with isovaleric acid is illustrated in the following example.

*Example 2*

A quantity of isoprene monohydrochloride equivalent to 2,000 parts by weight was stirred for four hours at room temperature with 17,000 parts by weight of a 15% sodium carbonate solution. Carbon dioxide was steadily evolved during the reaction. The isoprene monohydrochloride, which was present as an oily layer, gradually disappeared.

The reaction product was extracted with ether, and the ether removed by distillation. The extracted material thus obtained was fractionated to isolate isoprene alcohol.

There was thus obtained approximately 400 parts by weight of isoprene alcohol having the following physical properties:

Boiling point=95–100° C. at 760 mm.
Density $(d\ 20°/4°) = 0.8255$
Refractive index $(n\ 20°/D) = 1.41446$ Approximately 177 parts by weight of the isoprene alcohol thus prepared was added to a mixture of 102 parts of isovaleric acid and 200 parts of benzene. This mixture was treated with 7 parts of anhydrous hydrogen chloride and refluxed for a period of approximately 7 hours, during which the water of reaction, amounting to approximately 18 parts, was removed. The benzene and excess isoprene alcohol was removed by distillation, after which the residue was neutralized with a 10% sodium bicarbonate solution to remove hydrogen chloride and any unreacted isovaleric acid.

The residue was fractionated at a pressure of 10 mm. of mercury, absolute, to obtain a water-white liquid possessing an exceptionally pleasant fruity odor.

The quantity secured was approximately 72 parts by weight.

This particular isoprene isovalerate fraction was found to have the following physical properties:

Boiling point=82° C. at 11 mm., absolute
Density $(d\ 20°/4°) = 0.9104$
Refractive index $(n\ 20°/D) = 1.41615$ If desired, other esterification catalysts, such as sulfuric acid, phosphoric acid, and the like, may be employed, or the reaction may be carried out in the absence of a catalyst.

As pointed out above, isoprene isovalerate may also be prepared by reacting a metal salt of isovaleric acid with isoprene monohydrohalide. Refluxing the materials over a period of several hours has been found to be particularly effective. The presence of isovaleric acid facilitates the reaction.

After the reaction is complete, residual isovaleric acid, if any, may be neutralized, if desired, after which the ester formed may be recovered in any suitable manner, for instance, by extraction and the ester may be separated by any suitable manner, such as by distillation whereupon the ester may be further fractionated, if desired. Other separating and/or refining methods, as for example, the direct fractionation of the crude reaction mixture, may be used if desired.

The reaction between a metal salt of isovaleric acid and an isoprene monohydrohalide is illustrated in the following example.

*Example 3*

A mixture of 200 parts by weight of isoprene hydrochloride, 275 parts by weight of potassium isovalerate, and 200 parts by weight of isovaleric acid were refluxed for a period of approximately three hours. The reaction mixture was then cooled, poured into an equal volume of water, and neutralized with an alkaline solution such as sodium bicarbonate.

The isoprene isovalerate thus formed was extracted with diethyl ether; the ether removed by distillation, and the residue fractionated.

There was thus obtained approximately 139 parts by weight of an isoprene isovalerate fraction having the following physical properties:

Boiling point=70–71° C. at 8 mm., absolute
Density $(d\ 20°/4°) = 0.9876$
Refractive index $(n\ 20°/D) = 1.43317$ The product has a very pleasant odor, entirely free from the disagreeable odor of isovaleric acid.

The preparation of isoprene n-valerate from n-valeric acid and isoprene alcohol is illustrated by the following example.

Example 4

A mixture of 344 grams (4 mols) of isoprene alcohol, 204 grams (2 mols) of n-valeric acid, 400 grams of benzene, and 7 grams of sulfuric acid was refluxed for ten hours. Approximately 42 cc. of water was formed during this period, which was continuously removed by stratification in a trap placed on the condensate return line to the reaction vessel.

The reaction mixture was subsequently cooled and the acid neutralized by the addition of an aqueous 10% sodium bicarbonate solution.

After removal of the benzene and excess isoprene alcohol by distillation at atmopheric pressure, the residual ester was fractiontaed under reduced pressure.

A total of 200 grams of the n-valeric ester of isoprene alcohol was obtained. It is a colorless limpid liquid with a pleasant fruity odor, and having the following physical properties:

Boiling point=62–63° C. @ 3 mm.
Density $(d\ 20°/4°)=0.8701$
Refractive index $(n\ 20°/D)=1.4315$ The preparation of isoprene n-valerate by the reaction of a metal salt of n-valeric acid with an isoprene monohydrohalide is illustrated in the following example.

Example 5

A 171 gram portion (1.22 mols) of freshly prepared potassim n-valerate was added in small amounts to 500 grams of butyl carbitol in a 2-liter flask fitted with a reflux condenser and heated to a temperature of 95° C. To this hot solution was added 104 grams (1.0 mol) of isoprene monohydrochloride (B. P.=100–110° C.) dropwise through the reflux condenser. The mixture was stirred for a period of 5 hours at this temperature, after which the temperature was raised to 130° C. and the reaction continued for an additional period of 5 hours.

The reaction mixture was then cooled and the precipitate removed by filtration. The solids were washed with 300 grams of hot butyl carbitol, the wash liquid then being added to the reaction mixture. The clear mixture was distilled under reduced pressure to remove the butyl carbitol, after which the crude ester was fractionated.

Approximately 100 grams of isoprene n-valerate was thus secured, having the following physical properties:

Boiling point=79–82° C. @ 7 mm.
Density $(d\ 20°/4°)=0.8955$
Refractive index $(n\ 20°/D)=1.4355$ Other metal derivatives of n-valeric acid or isovaleric acid, such as the sodium, calcium, iron, lead, or other metal salts, may be substituted for the potassium salts given in the foregoing examples. The reaction may be carried out in the presence or absence of the free acid or anhydride, and in the presence or absence of a solvent such as benzene. The reaction may be carried out at any suitable temperature, such as the boiling point of the mixture, and may be carried out at any suitable pressure, such as atmospheric, sub-atmospheric, or super-atmospheric pressures.

The corresponding isoprene alcohol esters of pivalic acid and active valeric acid may be prepared in a similar manner.

The properties of the isoprene valerates make them excellent solvents or plasticizers for paints, lacquers, varnishes, enamels, and similar coating compositions. They are also particularly valuable as intermediates in chemical synthesis. Their unsaturated nature makes them convenient compounds for introducing additional constituents, thereby making possible the production of a wide variety of isoprene and isoprene valerate derivatives. The exceptionally pleasant odor of these materials recommend them for many uses to which materials of this character are put, such as in perfumes, soaps, pharmaceutical preparations, et cetera.

The use of these derivatives as lacquer solvents is illustrated by the following examples.

Example 6

A base mixture of the following components:

| | Parts |
|---|---|
| Ester gum | 2.5 |
| Nitro cellulose | 5 |
| Dibutyl phthalate | 2.5 | was thoroughly incorporated in 40 parts of the following solvent mixture:

| | Parts |
|---|---|
| Amyl alcohol | 10 |
| Isopropyl acetate | 13 |
| Anhydrous ethyl alcohol | 3 |
| Toluol | 34 |
| Saturated hydrocarbon fraction obtained in the pyrolysis of petroleum oil (B. P. 100–120° C.) known commercially as troluol | 20 |
| Isoprene n-valerate | 20 |

A clear lacquer was obtained which was applied to the surface of tin panels and permitted to dry overnight. A light colored, flexible adherent coating was obtained.

Ethyl cellulose might be substituted for nitrocellulose in the foregoing example.

Example 7

A base mixture of the following components:

| | Parts |
|---|---|
| Cellulose acetate | 6.5 |
| N-butyl ester of 3-methyl-Δ4-tetrahydrophthalic anhydride | 0.5 | was thoroughly incorporated in 93 parts of the following solvent mixture:

| | Parts |
|---|---|
| Acetone | 50 |
| Ethylene glycol monoethyl ether | 20 |
| Toluene | 15 |
| Isoprene isovalerate | 20 |

A clear lacquer was obtained which was applied to the surface of metallic panels and permitted to dry overnight. A colorless, flexible, adherent coating was obtained.

While the invention has been described more particularly in connection with the valeric acids as such, in its broadest phases, it also includes the preparation of substituted valeric acid esters of isoprene alcohol, such as are obtained by employing the desired substituted valeric acid (i. e., substituted n-valeric acid, substituted isovaleric acid, substituted pivalic acid and/or substituted active valeric acid) as starting material for preparing the desired ester.

The invention also comprehends the preparation of mixed esters, such as for instance by the reaction of a mixture of n-valeric and isovaleric acids with isoprene alcohol, or otherwise. It also comprehends the production of mixed esters by the reaction of a mixture of two or more acids, of which at least one is a valeric acid with isoprene alcohol, or otherwise.

Therefore, in the claims, the term "valeric compound" embraces normal valeric acid, isovaleric acid, pivalic acid, active valeric acid, substituted valeric acids and their salts, anhydrides, and acid halides. Also in the claims, the term "valeric acid" includes the anhydride, or mixtures of the acid and anhydride. The term "hydrogen halide" embraces hydrogen chloride, bromide, iodide and fluoride. The term "isoprene hydrohalide" embraces the isoprene derivatives of these four hydrogen halides. The term "isoprene" includes pure isoprene, technical or commercial grades thereof when produced, isoprene solutions, and hydrocarbon fractions containing any quantity of isoprene regardless of source. The term "isoprene derivative" is intended to embrace the hydroxyl derivative of isoprene, the metal derivatives of said hydroxyl derivative (i. e., the alcoholate), and the monohydrohalides of isoprene. The term "metal valerate" includes potassium, sodium, calcium, iron, lead, and other such salts of the isomeric valeric acids. Additionally, the term "esterification catalyst" includes such compounds as sulfuric acid, phosphoric acid, anhydrous hydrogen chloride, and the like.

While reagents and procedures of a particular nature have been specifically described, it is to be understood that these are by way of illustration. Therefore, changes, omissions, additions, substitutions and/or modifications might be made within the scope of the claims without departing from the spirit of the invention.

I claim:

1. A valeric ester of 3-methyl-3-hydroxy-butene-1 corresponding to the formula

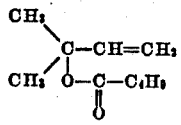

2. An n-valeric ester of 3-methyl-3-hydroxy-butene-1, said ester having a boiling range of approximately 65–75° C. at approximately 8 mm. absolute.

3. An isovaleric ester of 3-methyl-3-hydroxy-butene-1, said ester having a boiling range of approximately 75 to 85° C. at approximately 7 mm. absolute.

4. The process of preparing a valeric ester of 3-methyl-3-hydroxy-butene-1 which comprises reacting an isoprene derivative capable of yielding an alcohol radical corresponding to 3-methyl-3-hydroxy-butene-1 and derived from light oil isoprene, with a compound capable of yielding a valeric acid radical.

5. A process for preparing a valeric ester of 3-methyl-3-hydroxy-butene-1 comprising reacting one of a group consisting of 3-methyl-3-hydroxy-butene-1 derived from light oil isoprene and a metal derivative of said 3-methyl-3-hydroxy-butene-1 with one of a group consisting of a valeric acid and an acid halide of a valeric acid.

6. In the process of claim 5, the step of effecting esterification in the presence of an esterification catalyst.

7. In the process of claim 5, the step of continuously removing water during the esterification reaction.

8. The process of preparing a valeric ester of 3-methyl-3-hydroxy-butene-1 which comprises contacting a light oil isoprene fraction with a hydrogen halide to form a methyl halobutene, and reacting said methyl halobutene with a metal valerate.

9. In the process of claim 8, the step of effecting esterification in the presence of a solvent.

10. In the process of claim 8, the step of contacting the isoprene fraction with a halogen halide in the presence of a halogenating catalyst.

11. In the process of claim 8, the step of effecting esterification in the presence of a valeric acid.

12. The process of preparing a valeric ester of 3-methyl-3-hydroxy-butene-1 which comprises contacting a light oil isoprene fraction with a hydrogen halide to form a methyl halobutene, hydrolyzing said methyl halobutene to form a methyl hydroxybutene, and reacting said methyl hydroxybutene with a compound capable of yielding a valeric acid radical.

FRANK J. SODAY.